United States Patent
Desvignes et al.

(10) Patent No.: US 12,113,892 B2
(45) Date of Patent: Oct. 8, 2024

(54) DEVICE ACCESS AUTHORIZATION VIA CONNECTED USER EQUIPMENT

(71) Applicant: RAKUTEN MOBILE, INC., Tokyo (JP)

(72) Inventors: Julian Desvignes, Tokyo (JP); Luiz Guilherme Mesquita Kimel Dos Santos, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 400 days.

(21) Appl. No.: 17/456,585

(22) Filed: Nov. 25, 2021

(65) Prior Publication Data

US 2022/0399996 A1 Dec. 15, 2022

Related U.S. Application Data

(60) Provisional application No. 63/210,955, filed on Jun. 15, 2021.

(51) Int. Cl.
*H04L 9/08* (2006.01)
*H04L 9/32* (2006.01)

(52) U.S. Cl.
CPC .......... *H04L 9/0825* (2013.01); *H04L 9/0869* (2013.01); *H04L 9/3247* (2013.01); *H04L 9/3263* (2013.01); *H04L 9/3271* (2013.01)

(58) Field of Classification Search
CPC ... H04L 9/0825; H04L 6/0869; H04L 9/3247; H04L 9/3263; H04L 9/3271
See application file for complete search history.

(56) References Cited

U.S. PATENT DOCUMENTS

| | | | |
|---|---|---|---|
| 2003/0226017 A1 | 12/2003 | Palekar et al. | |
| 2007/0050618 A1* | 3/2007 | Roux | H04L 9/321 713/155 |
| 2015/0326560 A1* | 11/2015 | Menezes | H04L 63/0884 726/9 |
| 2017/0295171 A1* | 10/2017 | Bolignano | H04W 12/50 |
| 2019/0028892 A1* | 1/2019 | Henry | H04W 12/069 |
| 2019/0238346 A1 | 8/2019 | Perlman et al. | |
| 2019/0238520 A1* | 8/2019 | Espinosa | H04L 9/3263 |
| 2019/0253243 A1* | 8/2019 | Zimmerman | H04W 4/80 |

(Continued)

*Primary Examiner* — Darshan I Dhruv
(74) *Attorney, Agent, or Firm* — HAUPTMAN HAM, LLP (57) ABSTRACT

Device access authorization via connected user equipment is performed with a device including a controller, a memory in communication with the controller, the memory storing a device identifier, a registration service, and a limited access service, and a secure element in communication with the controller, the secure element storing a device authentication key and a registry certificate. The controller includes circuitry configured to transmit an authorization request to the user equipment, the authorization request including a request for authorization from a registry server, the device identifier, the user identifier, and the registry server challenge, receive an authorization response from the user equipment, the authorization response including an authorization confirmation and a registry server signature, verify the registry server signature using the registry certificate, and notify the user equipment of a limited access service in response to receiving the authorization confirmation and successfully verifying the registry server signature.

20 Claims, 7 Drawing Sheets

(56) References Cited

U.S. PATENT DOCUMENTS

| | | | | |
|---|---|---|---|---|
| 2020/0413248 A1* | 12/2020 | Yokum | ............... | H04W 12/50 |
| 2020/0413249 A1* | 12/2020 | Ramisetty | ........... | H04L 63/0853 |
| 2021/0105609 A1* | 4/2021 | Park | ................... | H04W 8/183 |
| 2021/0112411 A1* | 4/2021 | Pazhyannur | ......... | H04W 12/06 |
| 2021/0152537 A1 | 5/2021 | Bengani et al. | | |
| 2021/0377047 A1* | 12/2021 | Haque | ................. | H04L 9/3268 |
| 2021/0400437 A1* | 12/2021 | Trakinat | ............... | H04W 4/80 |
| 2022/0014374 A1* | 1/2022 | Lin | ...................... | H04W 4/70 |

* cited by examiner

DEVICE ACCESS AUTHORIZATION VIA CONNECTED USER EQUIPMENT

PRIORITY CLAIM AND CROSS-REFERENCE

This application claims priority to Provisional Application No. 63/210,955, filed Jun. 15, 2021, which is hereby incorporated by reference in its entirety.

BACKGROUND

In devices, such as peripheral devices or Internet-of-Things (IoT) devices using BLUETOOTH® or other short-range communication, the configuration basically allows any user equipment to connect and use the services. Services provided by such devices may include location information, such as tracking devices, video data, such as surveillance devices, or physical access, such as lock devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

In at least some embodiments, registering and authenticating user equipment connecting to a device enhances privacy. In at least some embodiments, a registry server provides proper access verification and an offline authentication system after registration.

The inventors have found that some devices do not control access based on the user of a user equipment. In order to control access based on a user of the user equipment, at least some embodiments communicate with a registry server that authenticates both the device and the user, and verifies that the user has registered for access to the device.

In at least some embodiments, the user equipment and device are initially paired together by a pairing system, such as that of BLUETOOTH®, to help ensure proper encryption of communications. In at least some embodiments, the user registers the user equipment within the device by communicating with a registry server, which verifies whether the user requesting access has permission. In order to register the user equipment trying to get access to the device, at least some embodiments of the device first transmit a request to a registry server that verifies whether the user of the user equipment requesting access has permission. In at least some embodiments, the data sent to the registry server is a user identifier, a user equipment identifier, and a device identifier, all of which are unique to the respective entity. In at least some embodiments, the registry server then sends a signed result to the device, passing the signed result through the user equipment, that the device will check with a burned certificate. In at least some embodiments, the user equipment authenticates with the device after registration by using an offline key provided to the user equipment as a result of the registration. In at least some embodiments, the offline key is exchanged with the user equipment to be used for authenticating offline later. In at least some embodiments, the offline key is secured within the device's secure element. In at least some embodiments, offline keys have an expiration time, so registration needs to be redone once the offline keys expire.

In at least some embodiments, offline authentication employs a Challenge-Handshake Authentication Protocol (CHAP) exchange between the device and the user equipment, using the offline key exchanged at registration. In at least some embodiments, the device provides two services, one for registration and authentication, and another being the primary purpose of the device. If the paired connection becomes disconnected, then the device returns to providing only registration and authentication, and authentication is redone in order to access the primary service. In at least some embodiments, the offline authentication allows the user equipment to authenticate with the device without a network connection to the registry server. In at least some embodiments, the offline authentication is more energy efficient than authentication through the registry server.

Figure 1:
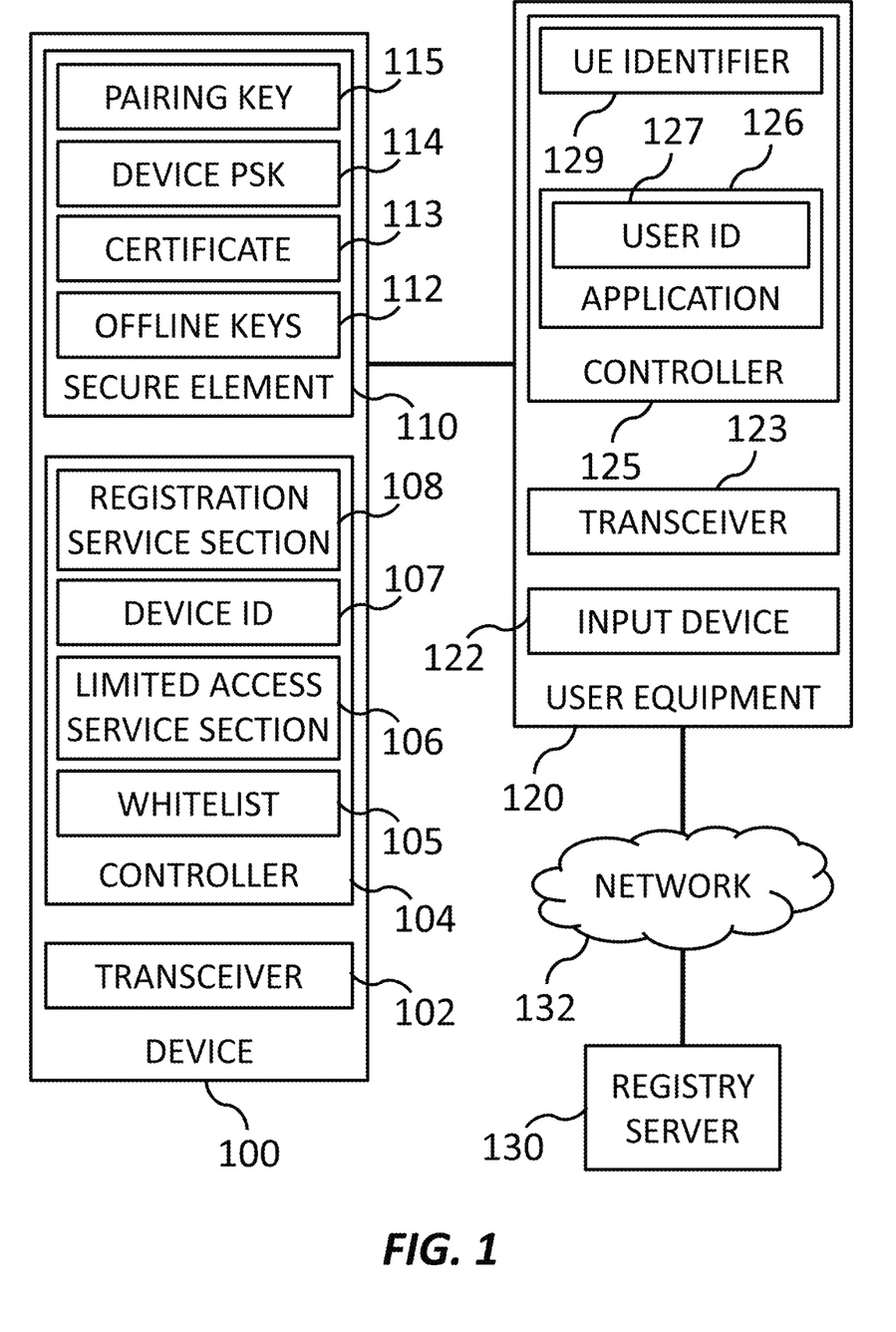
FIG. 1 is a block diagram of a system for device access authorization via connected user equipment, according to at least one embodiment of the present invention.

FIG. 1 is a block diagram of a system for device access authorization via connected user equipment, according to at least one embodiment of the present invention. The system includes a device 100, a user equipment 120, a registry server 130, and a network 132.

Device 100 includes a transceiver 102, a controller 104, and a secure element 110. In at least some embodiments, device 100 is a peripheral device, such as an Internet-of-Things (IoT) device.

Transceiver 102 is configured to communicate with other devices and networks, such as user equipment 120. In at least some embodiments, transceiver 102 is configured for short-range communication, such as BLUETOOTH®, Near Field Communication (NFC), Wi-Fi, etc. In at least some embodiments, transceiver 102 is configured for long-range communication, such as 3G, 4G LTE, 5G, or other cellular communication technologies, or for satellite communication, etc. In at least some embodiments, transceiver 102 is configured for wired communication.

Controller 104 is configured to control other elements of device 100, such as transceiver 102 and secure element 110, according to instructions executed thereon to perform operations, such as those described below with respect to FIGS. 3 and 4. In at least some embodiments, controller 104 includes a processor or programmable circuitry executing instructions to cause the processor or programmable circuitry to perform operations according to the instructions. In at least some embodiments, controller 104 includes analog or digital programmable circuitry, or any combination thereof. In at least some embodiments, controller 104 includes on-board memory, such as on-chip memory, or is otherwise in communication with memory. Controller 104 includes whitelist 105, limited access service section 106, device identifier 107, and registration service section 108. In at least some embodiments, device 100 includes a memory in communication with controller 104, the memory storing device identifier 107, registration service section 108, and limited access service section 106. In at least some embodiments, the memory further stores whitelist 105.

Whitelist 105 is a data set including user equipment identifiers associated with user equipment. In at least some embodiments, the associated user equipment are allowed access to limited access services, such as those of limited access service section 106. In at least some embodiments, controller 104 accesses whitelist 105 while performing operations. In at least some embodiments, whitelist 105 is stored in an on-chip memory of controller 104.

Limited access service section 106 is the circuitry or instructions of controller 104 configured to perform operations to provide one or more limited access services. In at least some embodiments, the limited access services include location transmission, audio transmission, video transmission, or transmission of other data or information of a sensitive or private nature. In at least some embodiments, the limited access services are the main operations of device 100, such as location transmission where device 100 is a tracking device, or video transmission where device 100 is a surveillance device. In at least some embodiments, limited access service section includes sub-sections for performing additional functions, as described in the following flow charts. Such sub-sections may be referred to by a name associated with their function.

Device identifier 107 is a data string that identifies device 100. In at least some embodiments, device identifier 107 is transmitted for verification and authentication, such as to registry server 130. In at least some embodiments, controller 104 accesses device identifier 107 while performing operations. In at least some embodiments, device identifier 107 is stored in an on-chip memory of controller 104.

Registration service section 108 is the circuitry or instructions of controller 104 configured to perform operations to provide one or more registration services. In at least some embodiments, the registration services include registering a user equipment for access to limited access services, such as those provided by limited access service section 106. In at least some embodiments, registration service section includes sub-sections for performing additional functions, as described in the following flow charts. Such sub-sections may be referred to by a name associated with their function.

Secure element 110 is configured for cryptography. In at least some embodiments, secure element 110 is configured to store crypto-keys and perform encryption and decryption operations. In at least some embodiments, secure element 110 includes a processor or programmable circuitry executing instructions to cause the processor or programmable circuitry to perform operations according to the instructions. In at least some embodiments, secure element 110 includes analog or digital programmable circuitry, or any combination thereof. In at least some embodiments, secure element 100 is a Secure Element (SE), Trusted Execution Environment (TEE), a Trusted Platform Module (TPM), a Hardware Security Module (HSM), or any other standardized cryptographic unit. Secure element 110 includes offline keys 112, a registry certificate 113, a device authentication Pre-Shared Key (PSK) 114, and a pairing key 115. In at least some embodiments, device 100 includes secure element 110 in communication with controller 104, secure element 110 storing device authentication key 114 and registry certificate 113. In at least some embodiments, secure element 110 further stores pairing key 115.

Offline keys 112 are data strings that are shared with registered user equipment, such as user equipment 120. In at least some embodiments, each offline key of offline keys 112 is a Security Association (SA). In at least some embodiments, each offline key is generated during a registration process performed by controller 104, and shared with the user equipment, once registered. In at least some embodiments, offline keys 112 are utilized during authentication after registration. In at least some embodiments, offline keys 112 are stored in a writable on-chip memory of secure element 110.

Registry certificate 113 is a data string for authentication of communications from a registry server, such as registry server 130. In at least some embodiments, registry certificate 113 is utilized during a registration process performed by controller 104 to authenticate communications from registry server 130. In at least some embodiments, registry certificate 113 is stored in a read-only on-chip memory of secure element 110.

Device authentication PSK 114 is a data string for authentication of device 100. In at least some embodiments, device authentication PSK 114 is utilized during a registration process performed by controller 104 to establish authenticity of communications to registry server 130. In at least some embodiments, registry certificate 113 is stored in a read-only on-chip memory of secure element 110.

Pairing key 115 is a data string for pairing device 100 with user equipment, such as user equipment 120. In at least some embodiments, pairing key 115 is generated and shared with user equipment 120 during a pairing process to encrypt communication between device 100 and user equipment 120. In at least some embodiments, pairing key 115 is stored in a writable on-chip memory of secure element 110.

User equipment 120 is for use directly by a user. In at least some embodiments, user equipment 120 is configured to allow a user to control device 100 by applying input to user equipment 120, and receive information from device 100 in response. User equipment 120 includes an input device 122, a transceiver 123, a controller 125, and a user equipment identifier 129.

Input device 122 is configured to receive input from a user of user equipment 120. In at least some embodiments, input device 122 includes one or more of a touch screen, a keyboard, a mouse, a microphone, a camera, or any other device configured to convert tactile, visual, or aural input to electrical signals. In at least some embodiments, the electrical signals are transmitted to controller 125 to instruct controller 125 to perform operations.

Transceiver 123 is configured to communicate with other devices and networks, such as device 100 and network 132. In at least some embodiments, transceiver 123 is configured for short-range communication, such as BLUETOOTH®, Near Field Communication (NFC), Wi-Fi, etc. In at least some embodiments, transceiver 123 is configured for long-range communication, such as 3G, 4G LTE, 5G, or other cellular communication technologies, or for satellite communication, etc. In at least some embodiments, transceiver 102 is configured for wired communication. In at least some embodiments, transceiver 123 is configured to communicate using more than one communication technology, such as using short-range communication to communicate with device 100 and using long-range or wired communication to communicate with network 132 during substantially the same period of time.

Controller 125 is configured to control other elements of user equipment 120, such as input device 122 and transceiver 123, according to instructions executed thereon to perform operations, such as those described below with respect to FIGS. 5 and 6. In at least some embodiments, controller 125 includes a processor or programmable circuitry executing instructions to cause the processor or programmable circuitry to perform operations according to the instructions. In at least some embodiments, controller 125 includes analog or digital programmable circuitry, or any combination thereof. In at least some embodiments, controller 125 includes physically separated storage or circuitry that interacts through communication. Controller 125 includes application 126 and user equipment identifier 129.

Application 126 is a set of instructions, which, upon execution, cause operations to be performed. In at least some embodiments, application 126 causes operations to be performed for registering user equipment 120 for use with device 100. In at least some embodiments, application 126 causes operations to be performed for controlling device 100. In at least some embodiments, application 126 is executable by controller 125 to cause controller 125 to perform operations, such as those described below with respect to FIGS. 5 and 6. Application 126 utilizes user identifier 127 in the performance of operations. In at least some embodiments, application 126 is stored in a writable on-chip memory of controller 125 or a separate memory in communication with controller 125.

User identifier 127 is a data string that identifies a user of user equipment 120. In at least some embodiments, user identifier 127 is transmitted for verification and authentication, such as to registry server 130. In at least some embodiments, application 126 accesses user identifier 127 while performing operations. In at least some embodiments, user identifier 127 is stored in an on-chip memory of controller 125, a separate memory in communication with controller 125.

User equipment identifier 129 is a data string that identifies user equipment 120. In at least some embodiments, user equipment identifier 129 is transmitted for identification, such as to registry server 130. In at least some embodiments, application 126 causes controller 125 to access user equipment identifier 129 while performing operations. In at least some embodiments, user equipment identifier 129 is stored in an on-chip memory of controller 125, a separate memory in communication with controller 125.

Registry server 130 is configured to respond to authorization requests from network 132. In at least some embodiments, registry server 130 is a personal computer, server, mainframe, etc., including instructions which are executed by registry server 130 to perform operations, such as those described below with respect to FIG. 7.

Network 132 is configured to facilitate communication among electronics, such as user equipment 120 and registry server 139. In at least some embodiments, network 132 is a wide area network, such as the Internet, that connects many different provider networks. In at least some embodiments, network 132 has many access points throughout a geographic area, each supporting one or more communication standards so that many different types of user devices are able to connect.

In at least some embodiments, the controller and storage thereof need not be integrated, but share circuitry or one or more computer-readable mediums in some embodiments. In at least some embodiments, the controller storage includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

Figure 2:
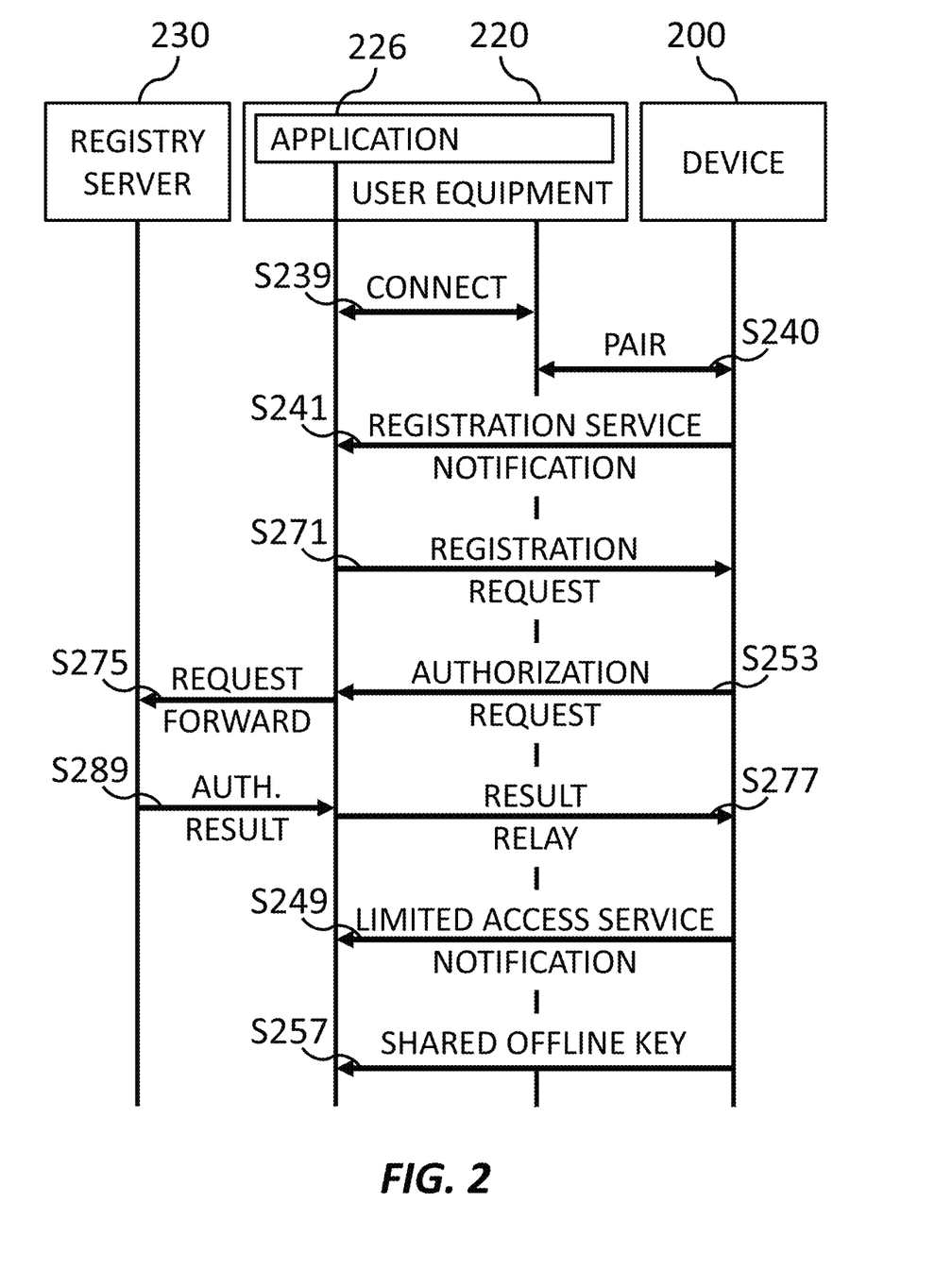
FIG. 2 is an informational flow for device access authorization via connected user equipment, according to at least one embodiment of the present invention.

FIG. 2 is an informational flow for device access authorization via connected user equipment, according to at least one embodiment of the present invention. The informational flow is conducted to perform a process of registering user equipment 220 for use with device 200. In at least some embodiments, device 200 requires registration of user equipment 220 before allowing application 226 access to certain services.

At S239, application 226 connects to user equipment 220. In at least some embodiments, the connection allows application 226 to control user equipment 220. In at least some embodiments, user equipment requires authentication of application 226 provides authentication information to user equipment 220, and user equipment 220 provides control information to application 226.

At S240, user equipment 220 pairs with device 200. In at least some embodiments, device 200 shares a pairing key with user equipment. In at least some embodiments, the pairing key is used to encrypt and decrypt communications between user equipment 220 and device 200.

At S241, device 200 transmits a registration service notification to application 226. In at least some embodiments, the registration service notification includes information about registering user equipment 220 with device 200 so that device 200 grants user equipment 220 access to limited access services.

At S271, application 226 transmits a registration request to device 200. In at least some embodiments, the registration request includes a user identifier and a user equipment identifier. In at least some embodiments, the registration request does not include the user identifier.

At S253, device 200 transmits an authorization request for authorization from registry server 230 to application 226. In at least some embodiments, the authorization request includes the user identifier, the user equipment identifier, and a challenge for the registry server. In at least some embodiments, the challenge includes a data string encrypted with a device authentication PSK, such as device authentication PSK 114 of FIG. 1. In at least some embodiments, the authorization request does not include the user identifier nor the user equipment identifier.

At S275, application 226 forwards the request for authentication to registry server 230. In at least some embodiments, application 226 adds the user identifier to the request for authentication before forwarding the request for authentication to registry server 230.

At S289, registry server 230 transmits an authorization result to application 226. In at least some embodiments, the authorization result includes an authorization confirmation and a registry server signature. In at least some embodiments, the authorization result includes an authorization denial instead of an authorization confirmation.

At S277, application 226 relays the authorization result to device 200.

At S249, device 200 transmits a limited access service notification to application 226. In at least some embodiments, the limited access service notification includes information about using one or more limited access services of device 200. In at least some embodiments, device 200 transmits the limited access service notification in response to receiving the authorization confirmation and successfully verifying the registry server signature.

At S257, device 200 transmits a shared offline key to application 226. In at least some embodiments, the shared offline key is provided to application 226 as proof of prior registration, so that user equipment 220 is able to gain access to limited access services even when there is no active connection to registry server 230.

Figure 3:
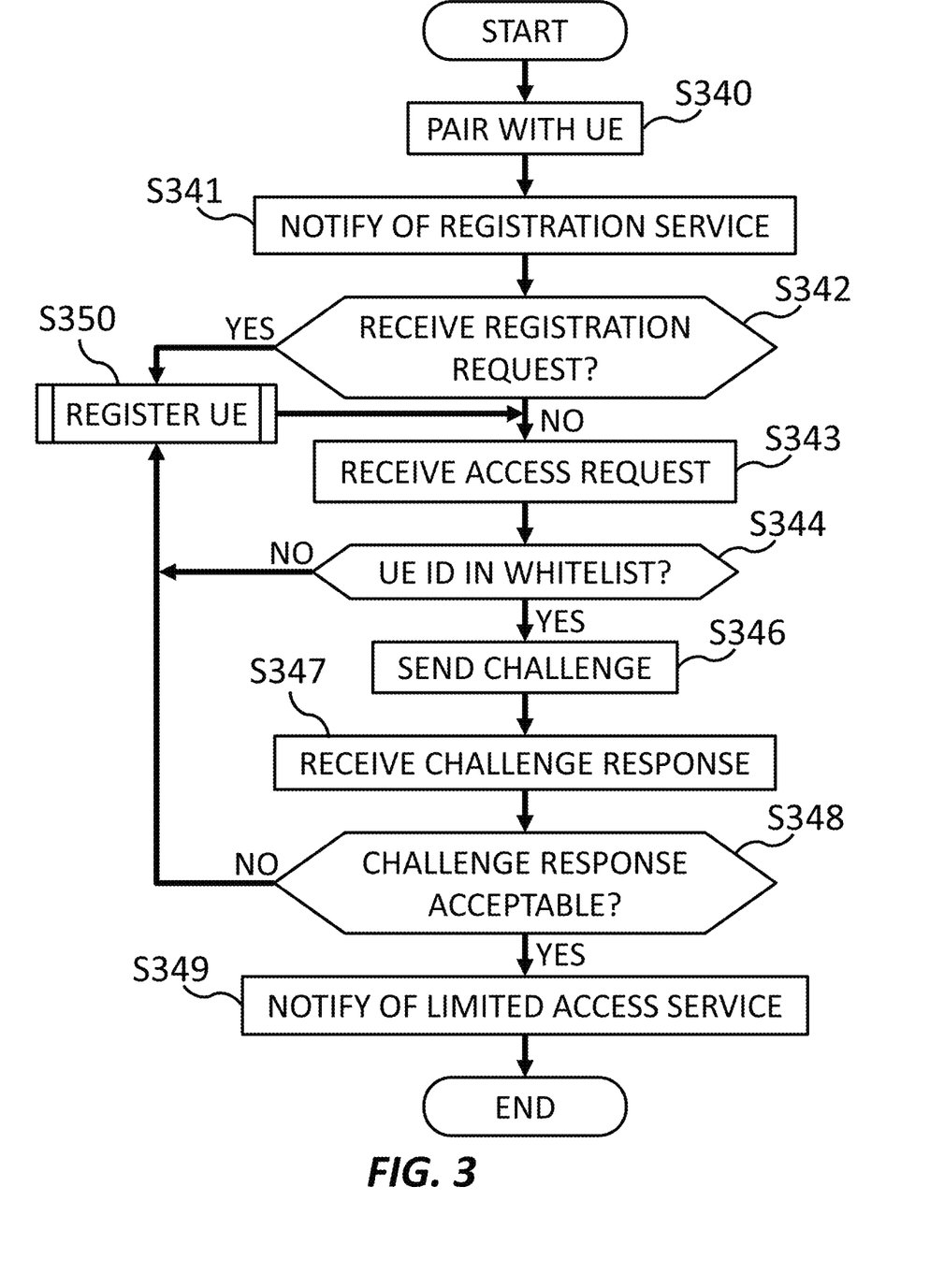
FIG. 3 is an operational flow for limiting access to device service, according to at least one embodiment of the present invention.

FIG. 3 is an operational flow for limiting access to device service, according to at least one embodiment of the present invention. The operational flow provides a method of limiting access to device service. In at least some embodiments, the method is performed by a device controller including sections for performing certain operations, such as controller 104 shown in FIG. 1.

At S340, a device controller or a section thereof pairs with a user equipment. In at least some embodiments, the device controller generates and shares a pairing key with the user equipment. In at least some embodiments, the pairing key is used to encrypt and decrypt communications between the device and the user equipment. In at least some embodiments, the device controller stores the pairing key in a secure element, such as secure element 110 shown in FIG. 1. In at least some embodiments, the device controller includes circuitry configured to establish a secure communication tunnel with the user equipment using the pairing key before the notifying of the registration service. In at least some embodiments, the device controller includes circuitry configured to establish the secure communication tunnel using a peer-to-peer communication protocol, in which each of the device controller and the user equipment acts as a server for the other. In at least some embodiments, the communication tunnel is routed through other communication devices that facilitate the communication but do not participate in the communication.

At S341, the device controller or a section thereof notifies the user equipment of a registration service. In at least some embodiments, the device controller transmits information about registering the user equipment with the device, registration being required for the device to grant the user equipment access to limited access services. In at least some embodiments, the device controller includes circuitry configured to notify a user equipment of a registration service.

At S342, the device controller determines whether a registration request is received from the user equipment. If the device receives a registration request from the user equipment, then the operational flow proceeds to user equipment registration at S350. If the device does not receive a registration request from the user equipment, then the operational flow proceeds to access request reception at S343.

At S350, the device controller or a section thereof registers the user equipment to grant the user equipment access to limited access services. In at least some embodiments, the device controller requests authorization from a registry server for registration of the user equipment, such as through the operational flow shown in FIG. 4, described hereinafter.

At S343, the device controller or a section thereof receives an access request from the user equipment. In at least some embodiments, the access requests includes a user equipment identifier, which identifies the user equipment. In at least some embodiments, the device controller includes circuitry configured to receive an access request from the application to access the limited access service, the access request including the user equipment identifier.

At S344, the device controller determines whether the user equipment identifier received at S343 is included in a whitelist. In at least some embodiments, the device controller accesses a whitelist stored on an on-chip memory of the device controller. In at least some embodiments, the device controller records user equipment identifiers in response to successful registration of user equipment, so that the presence of the user equipment identifier in the whitelist indicates that the user equipment has previously registered. In at least some embodiments, the device controller includes circuitry configured to verify the user equipment identifier using the whitelist. If the user equipment identifier is present in the whitelist, then the operational flow proceeds to the challenge at S346. If the user equipment identifier is not present in the whitelist, then the operational flow returns to user equipment registration at S350. In at least some embodiments, the device controller includes circuitry configured to transmit a denial of access in response to determining that the user equipment identifier is not in the whitelist.

At S346, the device controller or a section thereof sends a challenge to the user equipment. In at least some embodiments, the device controller sends a randomly generated string of data to the user equipment. In at least some embodiments, the device controller includes circuitry configured to transmit a randomly generated string to the application.

At S347, the device controller or a section thereof receives a challenge response from the user equipment. In at least some embodiments, the challenge response includes an encrypted string of data. In at least some embodiments, the device controller includes circuitry configured to receive the encrypted string from the application.

At S348, the device controller determines whether the challenge response is acceptable. In at least some embodiments, the device controller includes circuitry configured to verify the encrypted string using the offline key and the randomly generated string. In at least some embodiments, the device controller encrypts a randomly generated string using an offline key associated with the user equipment identifier, and compares the result with the encrypted string of data received at S347. In at least some embodiments, the device controller includes circuitry configured to encrypt the randomly generated string using the offline key, and determine whether the encrypted string received from the application matches the result of encrypting the randomly generated string. In at least some embodiments, the association of the offline key with the user equipment identifier indicates that the offline key was shared with the user equipment upon successful registration of the user equipment. If the result of encryption by the device controller matches the encrypted string of data received at S347, then the operational flow proceeds to limited access service notification at S349. In at least some embodiments, the device controller includes circuitry configured to grant the access request to access the limited access service. If the result of encryption by the device controller does not match the encrypted string of data received at S347, then the operational flow returns to user equipment registration at S350. In at least some embodiments, the device controller includes circuitry configured to transmit a denial of access in response to determining that the encrypted string does not match the result of encrypting the randomly generated string.

At S349, the device controller or a section thereof notifies the user equipment of one or more limited access services. In at least some embodiments, the device controller transmits information about using one or more limited access services of the device. In at least some embodiments, the device controller includes circuitry configured to notify the user equipment of a limited access service in response to successfully verifying the user equipment identifier and the encrypted string. The device controller only transmits the limited access service notification to user equipment that have a user equipment identifier present in the whitelist (S344) and provide an acceptable challenge response (S348). In at least some embodiments, the limited access service is not available to the user equipment until the authorization confirmation is received and the registry server signature is verified.

In the foregoing embodiments, the communication is described as being between a device controller and a user equipment. In at least some embodiments, the user equipment is controlled by an application thereon. In at least some embodiments, the device controller does not discern whether incoming transmissions originate from a specific application or other area of the user equipment. In at least some embodiments, one or more of the foregoing transmissions to or from the user equipment originate or are destined for an application thereon.

Figure 4:
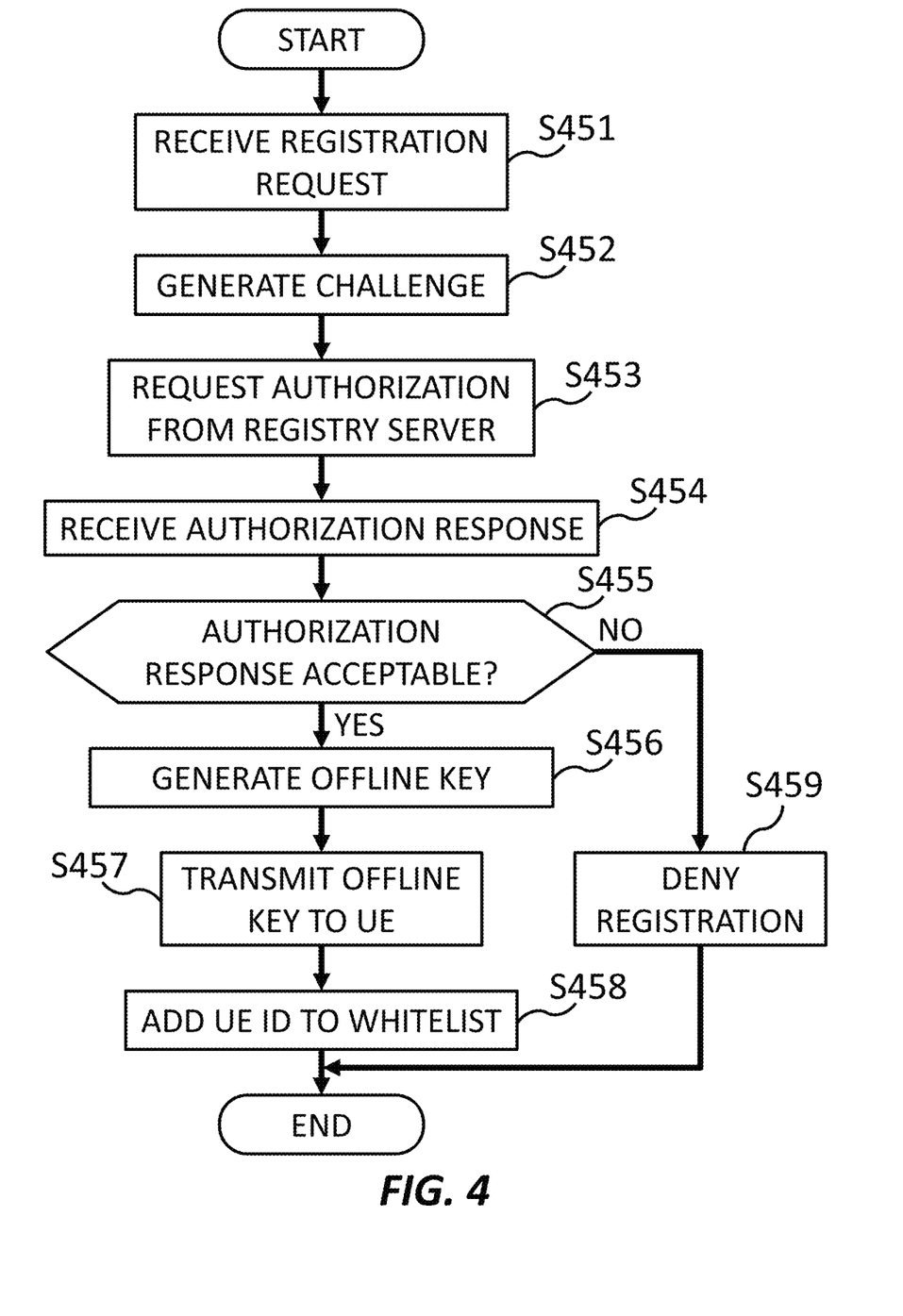
FIG. 4 is an operational flow for registration confirmation via connected user equipment, according to at least one embodiment of the present invention.

FIG. 4 is an operational flow for registration confirmation via connected user equipment, according to at least one embodiment of the present invention. The operational flow provides a method of registering a user equipment, such as operation S350 shown in FIG. 3. In at least some embodiments, the method is performed by a device controller including sections for performing certain operations, such as controller 104 shown in FIG. 1.

At S451, the device controller or a section thereof receives a registration request from the user equipment. In at least some embodiments, the registration request includes a user identifier and a user equipment identifier. In at least some embodiments, the registration request does not include the user identifier. In at least some embodiments, the device controller includes circuitry configured to receive the registration request from an application executed on the user equipment, the registration request having the user identifier.

At S452, the device controller or a section thereof generates a challenge for a registry server. In at least some embodiments, the device controller encrypts a random string of a data using a device authentication PSK, such as device authentication PSK 114 shown in FIG. 1. In at least some embodiments, the device authentication PSK is known only by the registry server. In at least some embodiments, the device controller includes circuitry configured to generate the registry server challenge based on the device authentication key.

At S453, the device controller or a section thereof transmits a request for registration authorization to the user equipment. In at least some embodiments, the device controller transmits, as part of the request for registration authorization, a device identifier, the generated random string of data, the encrypted random string of data, the user identifier, and the user equipment identifier. In at least some embodiments, the device controller does not transmit the user identifier as part of the request for registration authorization. In at least some embodiments, the device controller does not transmit the user equipment identifier as part of the request for registration authorization. In at least some embodiments, the device controller includes circuitry configured to transmit an authorization request to the application, the authorization request including a request for authorization from the registry server, the device identifier, the user identifier, and the registry server challenge.

At S454, the device controller or a section thereof receives a response to the request for registration authorization from the user equipment. In at least some embodiments, the device controller receives a signature from the registry server, and either an authorization confirmation or an authorization denial. In at least some embodiments, the device controller includes circuitry configured to receive the authorization response from the application, the authorization response including the authorization confirmation and the registry server signature.

At S455, the device controller determines whether the response to the request for registration authorization received at S454 is acceptable. In at least some embodiments, the device controller verifies the signature from the registry server using a registry certificate, such as registry certificate 113 shown in FIG. 1. In at least some embodiments, the device controller includes circuitry configured to verify the registry server signature using the registry certificate. If the response received at S454 includes an authorization confirmation and the device controller verifies the signature from the registry server, then the operational flow proceeds to offline key generation at S456. If the response received at S454 includes an authorization denial or the device controller does not verify the signature from the registry server, then the operational flow proceeds to registration denial at S459.

At S456, the device controller or a section thereof generates an offline key. In at least some embodiments, the device controller stores the offline key in a secure element of the device, such as secure element 110 shown in FIG. 1. In at least some embodiments, the device controller associates the offline key with the user equipment identifier. In at least some embodiments, the secure element stores the offline key in a way in which the offline key cannot be read directly by the device controller, but can be utilized by the controller for cryptography operations, such as the operation at S348 shown in FIG. 3. In at least some embodiments, the device controller includes circuitry configured to generate an offline key in the secure element associated with the user equipment identifier.

At S457, the device controller transmits the offline key to the user equipment. In at least some embodiments, the device controller includes circuitry configured to transmit a copy of the offline key to the application. In at least some embodiments, the device controller then deletes the offline key from any location of the device other than the secure element.

At S458, the device controller adds the user equipment identifier to a whitelist. In at least some embodiments, the device controller stores the whitelist in an on-chip memory of the device controller. In at least some embodiments, the device controller includes circuitry configured to add the user equipment identifier to the whitelist.

At S459, the device controller transmits a registration denial to the user equipment. In at least some embodiments, the device controller stores a count of registration denials in association with the user equipment identifier, and blocks registration in response to the count increasing past a threshold value representing a number of registration denials.

In the foregoing embodiments, the communication is described as being between a device controller and a user equipment. In at least some embodiments, the user equipment is controlled by an application thereon. In at least some embodiments, the device controller does not discern whether incoming transmissions originate from a specific application or other area of the user equipment. In at least some embodiments, one or more of the foregoing transmissions to or from the user equipment originate or are destined for an application thereon.

In at least some embodiments, the device controller is configured to add an application identifier to the whitelist in addition to the user equipment identifier. In at least some embodiments, the application identifier is unique to the application being executed on the user equipment to register the user equipment with the device. In at least some embodiments, the device controller is configured to further verify the application identifier before allowing access to the limited access services.

In at least some embodiments, the device controller is configured to provide a registration editing service, which allows the user equipment to view, edit, or reset the registered devices. In at least some embodiments, the registration editing service is useful for transfers of device ownership. In at least some embodiments, the device controller is configured to receive updates to the registration from the registry server. In at least some embodiments of the registry server, the registry server is configured to provide a user interface for editing device registration.

Figure 5:
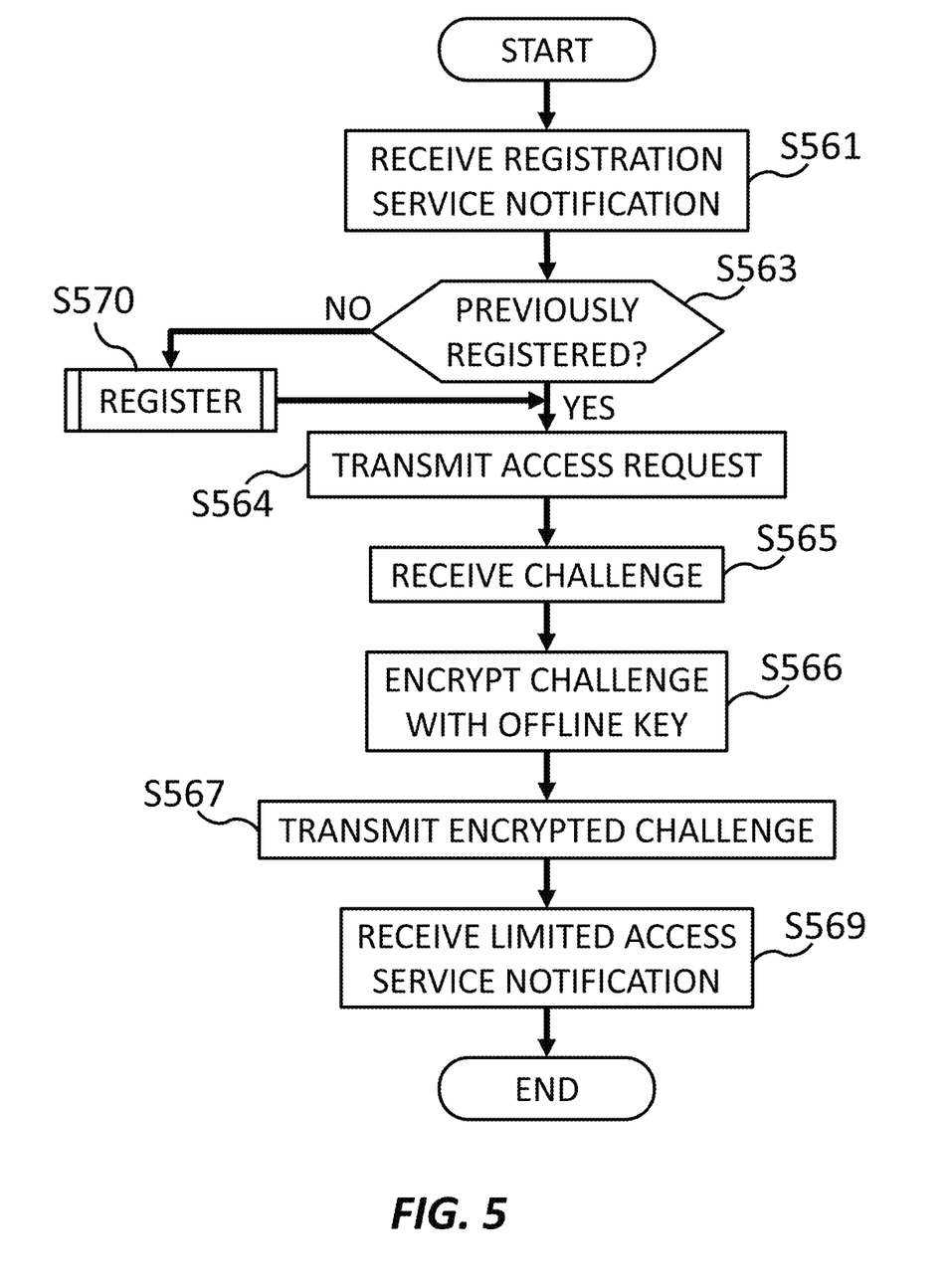
FIG. 5 is an operational flow for limited access authentication, according to at least one embodiment of the present invention.

FIG. 5 is an operational flow for limited access authentication, according to at least one embodiment of the present invention. The operational flow provides a method of accessing device service. In at least some embodiments, the method is performed by a user equipment controller, such as controller 125 shown in FIG. 1, executing instructions of an application. In at least some embodiments, the user equipment controller includes sections for performing certain operations.

At S561, the user equipment controller or a section thereof receives a notification of a registration service from a device. In at least some embodiments, the device has paired with the user equipment, and communication between the device and the user equipment is encrypted. In at least some embodiments, the registration service notification includes information about registering the user equipment with the device so that user equipment can gain access to limited access services of the device.

At S563, the user equipment controller or a section thereof determines whether the user equipment has previously registered with the device. In at least some embodiments, the user equipment controller determines whether an offline key is stored in an on-chip memory of the user equipment controller in associated with a device identifier of the device. If the user equipment controller determines that the user equipment has not previously registered with the device, then the operational flow proceeds to registration at S570. If the user equipment controller determines that the user equipment has previously registered with the device, then the operational flow proceeds to access request transmission at S564.

At S570, the user equipment controller or a section thereof registers the user equipment with the device so that the user equipment is allowed access to limited access services. In at least some embodiments, the user equipment controller forwards a request for authorization from the device to a registry server for registration of the user equipment, such as in the operational flow shown in FIG. 6, described hereinafter.

At S564, the user equipment controller or a section thereof transmits an access request to the device. In at least some embodiments, the access requests includes a user equipment identifier, which identifies the user equipment.

At S565, the user equipment controller or a section thereof receives a challenge from the device. In at least some embodiments, the user equipment controller receives a randomly generated string of data from the device.

At S566, the user equipment controller encrypts the randomly generated string using an offline key associated with the device. In at least some embodiments, the association of the offline key with the device identifier indicates that the offline key was shared with the user equipment by the device upon successful registration of the user equipment with the device.

At S567, the user equipment controller or a section thereof transmits a challenge response to the device. In at least some embodiments, the challenge response includes the encrypted string of data encrypted at S566.

At S569, the user equipment controller or a section thereof receives a notification of a limited access service from the device. In at least some embodiments, the user equipment controller receives information about using one or more limited access services of the device. The user equipment controller only receives the limited access service notification by providing a user equipment identifier present in a whitelist and an acceptable challenge response (S348).

Figure 6:
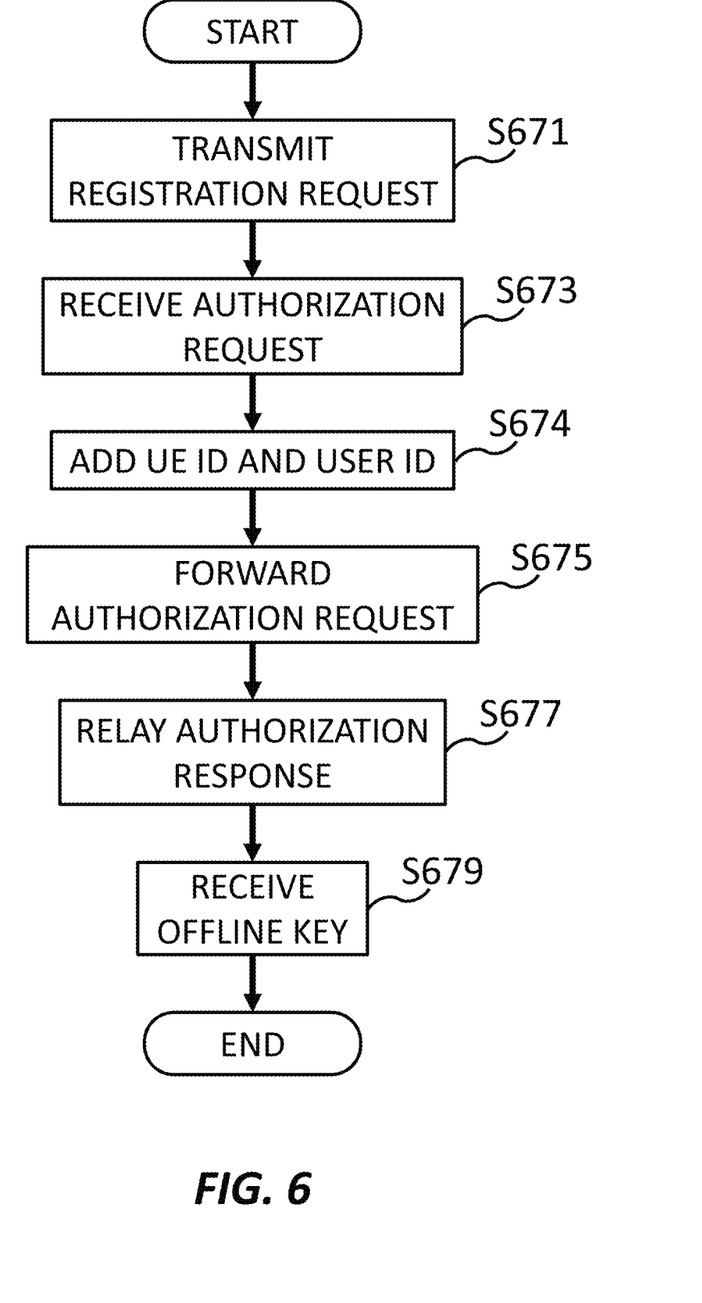
FIG. 6 is an operational flow for device registration confirmation, according to at least one embodiment of the present invention.

FIG. 6 is an operational flow for user equipment registration confirmation, according to at least one embodiment of the present invention. The operational flow provides a method of registering a user equipment, such as operation S570 shown in FIG. 5. In at least some embodiments, the method is performed by a user equipment controller, such as controller 125 shown in FIG. 1, executing instructions of an application. In at least some embodiments, the user equipment controller includes sections for performing certain operations.

At S671, the user equipment controller or a section thereof transmits a request to register the user equipment with the device. In at least some embodiments, the registration request includes a user equipment identifier.

At S673, the user equipment controller or a section thereof receives a request for registration authorization from the device. In at least some embodiments, the user equipment controller receives, as part of the request for registration authorization, a device identifier, a generated random string of data and an encrypted string of data.

At S674, the user equipment controller or a section thereof adds a user identifier and the user equipment identifier to the request for registration authorization. In at least some embodiments, the user equipment controller adds authentication of the user, such as a user name and a password, to the request for registration authorization.

At S675, the user equipment controller or a section thereof forwards the request for registration authorization, which includes the user identifier and the user equipment identifier added at S674, to a registry server.

At S677, the user equipment controller or a section thereof relays a response to the request for registration authorization from the registry server to the device. In at least some embodiments, the response includes a signature from the registry server, and either an authorization confirmation or an authorization denial.

At S679, the user equipment controller or a section thereof receives an offline key from the device. In at least some embodiments, the user equipment controller stores the offline key in an on-chip memory of the user equipment controller. In at least some embodiments, the user equipment controller associates the offline key with the device identifier. In at least some embodiments, the on-chip memory stores the offline key in a way in which the offline key cannot be read directly by the user equipment controller, but can be utilized by the user equipment controller for cryptography operations, such as the operation at S566 shown in FIG. 5.

Figure 7:
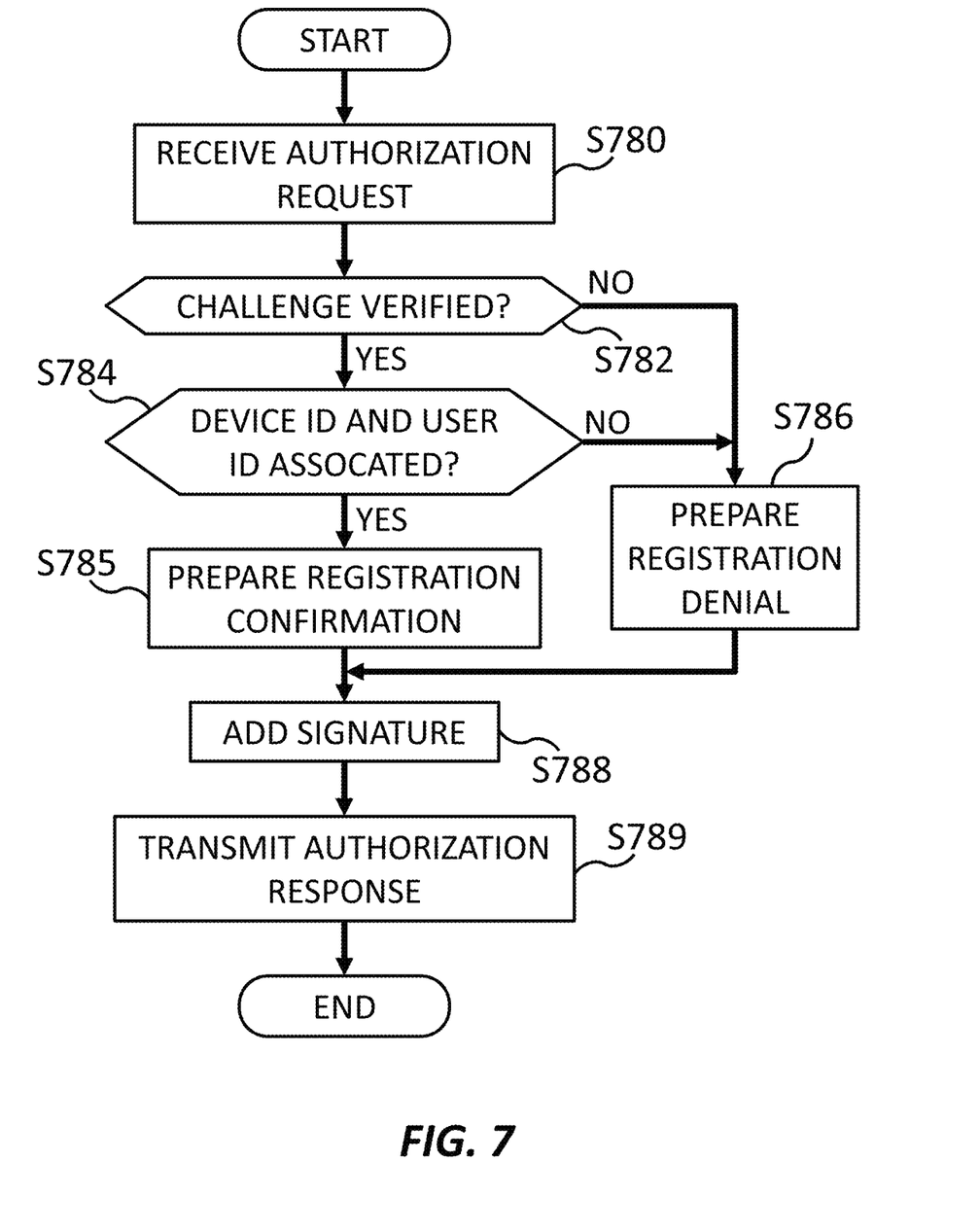
FIG. 7 is an operational flow for user equipment authentication, according to at least one embodiment of the present invention.

FIG. 7 is an operational flow for user equipment authentication, according to at least one embodiment of the present invention. The operational flow provides a method of authorizing user equipment registration. In at least some embodiments, at least a portion of the method is performed by a registry server, such as registry server 130 shown in FIG. 1. In at least some embodiments, the registry server includes sections for performing certain operations.

At S780, the registry server or a section thereof receives a request for registration authorization from a user equipment. In at least some embodiments, the request for registration authorization includes a device identifier, a user identifier, a user equipment identifier, and a challenge, which includes a random string of data and an encrypted string of data.

At S782, the registry server or a section thereof verifies the challenge included in the request for registration authorization. In at least some embodiments, the registry server encrypts the random string of data using a device PSK associated with the device identifier to verify whether the result matches the encrypted string of data included in the request for registration authorization. In at least some embodiments, the device PSK was shared between the device and the registry server upon manufacturing of the device. In at least some embodiments, the registry server includes a plurality of PSKs, each PSK associated with a unique device. If the result of encrypting the random string of data using a device PSK associated with the device identifier matches the encrypted string of data included in the request for registration authorization, then the operational flow proceeds to association determination at S784. If the result of encrypting the random string of data using a device PSK associated with the device identifier does not match the encrypted string of data included in the request for registration authorization, then the operational flow proceeds to registration denial at S786.

At S784, the registry server or a section thereof determines whether the device identifier and the user identifier included in the request for registration authorization are associated. In at least some embodiments, the registry server includes a table of associated user identifiers associated with one or more device identifiers. In at least some embodiments, the registry server added the device identifier to the table in association with the user identifier in response to the purchase of a device identified by the device identifier through an account identified by the user identifier. In other words, in at least some embodiments, the association of the device identifier and the user identifier demonstrates ownership of the device by a user identified by the user identifier. If the device identifier and the user identifier included in the request for registration authorization are associated, then the operational flow proceeds to registration confirmation preparation at S785. If the device identifier and the user identifier included in the request for registration authorization are associated, then the operational flow proceeds to registration denial at S786.

At S785, the registry server or a section thereof prepares a registration confirmation. In at least some embodiments, the registration confirmation is a binary response that confirms registration instead of denying registration.

At S786, the registry server or a section thereof prepares a registration denial. In at least some embodiments, the registration denial is a binary response that denies registration instead of confirming registration.

At S788, the registry server or a section thereof adds a registry server signature to the registration confirmation prepared at S785 or the registration denial prepared at S786 for an authorization response. In at least some embodiments, the authorization response includes the registry server signature and the registration confirmation. In at least some embodiments, the registry server signature is included to authenticate the authorization response. In at least some embodiments, the device identified by the device identifier includes a certificate to use to authenticate the authorization response via the registry server signature.

At S789, the registry server or a section thereof transmits the authorization response to the user equipment. In at least some embodiments, the registry server transmits the authorization response through a network, such as network 132 in FIG. 1.

In the foregoing embodiment, the communication is described as being between a registry server and a user equipment. In at least some embodiments, the user equipment is controlled by an application thereon. In at least some embodiments, the registry server does not discern whether incoming transmissions originate from a specific application or other area of the user equipment. In at least some embodiments, one or more of the foregoing transmissions to or from the user equipment originate or are destined for an application thereon.

In at least some embodiments, the request for registration authorization includes authentication of the user, such as a user name and a password. In at least some embodiments, the registry server further verifies that the password matches the password associated with the user name in a database of the registry server.

In at least some embodiments where the registry server is a computer, a program that is installed in the computer is capable of causing the computer to function as or perform operations associated with the registry server of the embodiments described herein. In at least some embodiments, such a program is executable by a processor to cause the computer to perform certain operations associated with some or all of the blocks of flowcharts and block diagrams attributed to the registry server described herein.

Various embodiments of the present invention are described with reference to flowcharts and block diagrams whose blocks may represent (1) steps of processes in which operations are performed or (2) sections of a controller responsible for performing operations. Certain steps and sections are implemented by dedicated circuitry, programmable circuitry supplied with computer-readable instructions stored on computer-readable media, and/or processors supplied with computer-readable instructions stored on computer-readable media. In some embodiments, dedicated circuitry includes digital and/or analog hardware circuits and may include integrated circuits (IC) and/or discrete circuits. In some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Various embodiments of the present invention include a system, a method, and/or a computer program product. In some embodiments, the computer program product includes a computer readable storage medium (or media) having computer readable program instructions thereon for causing a processor to carry out aspects of the present invention.

In some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, computer readable program instructions described herein are downloadable to respective computing/processing devices from a computer readable storage medium or to an external computer or external storage device via a network, for example, the Internet, a local area network, a wide area network and/or a wireless network. In some embodiments, the network may includes copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, the computer readable program instructions are executed entirely on the user's computer, partly on the user's computer, as a stand-alone software package, partly on the user's computer and partly on a remote computer or entirely on the remote computer or server. In some embodiments, in the latter scenario, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. It will be apparent to persons skilled in the art that various alterations and improvements can be added to the above-described embodiments. It will also be apparent from the scope of the claims that the embodiments added with such alterations or improvements are included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

According to at least one embodiment of the present invention, device access authorization via connected user equipment is performed with a device including a controller, a memory in communication with the controller, the memory storing a device identifier, a registration service, and a limited access service, and a secure element in communication with the controller, the secure element storing a device authentication key and a registry certificate. The controller includes circuitry configured to notify a user equipment of a registration service, receive a registration request from the user equipment, the registration request having a user identifier, generate a registry server challenge based on the device authentication key, transmit an authorization request to the user equipment, the authorization request including a request for authorization from a registry server, the device identifier, the user identifier, and the registry server challenge, receive an authorization response from the user equipment, the authorization response including an authorization confirmation and a registry server signature, verify the registry server signature using the registry certificate, and notify the user equipment of a limited access service in response to receiving the authorization confirmation and successfully verifying the registry server signature.

Some embodiments include instructions in a computer program recorded onto a computer-readable medium for performing the operations of the controller when executed by the computer, and a method of operations performed by the controller.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device comprising:
   a controller;
   a memory in communication with the controller, the memory storing a device identifier, a registration service, and a limited access service; and
   a secure element in communication with the controller, the secure element storing a device authentication key and a registry certificate;
   wherein the controller includes circuitry configured to:
   notify a user equipment of a registration service,
   receive a registration request from the user equipment, the registration request for permission to access the limited access service, the registration request having a user identifier,
   generate a challenge for a registry server based on the device authentication key,
   transmit an authorization request to the user equipment, the authorization request including a request for authorization from the registry server, the device identifier, the user identifier, and the challenge,
   receive an authorization response from the registry server via the user equipment, the authorization response including an authorization confirmation and a registry server signature,
   verify the registry server signature using the registry certificate, and
   notify the user equipment of a limited access service in response to receiving the authorization confirmation and successfully verifying the registry server signature.

2. The device of claim 1,
   wherein the memory is further configured to store a whitelist; and
   wherein the circuitry is further configured to, in response to receiving the authorization confirmation and successfully verifying the registry server signature:
   generate an offline key in the secure element associated with the user equipment identifier,
   transmit a copy of the offline key to the user equipment, and
   add the user equipment identifier to the whitelist.

3. The device of claim 2, wherein the circuitry is further configured to:
   receive an access request from the user equipment for accessing the limited access service, the access request including the user equipment identifier,
   verify the user equipment identifier using the whitelist,
   transmit a randomly generated string to the user equipment,
   receive an encrypted string from the user equipment,
   verify the encrypted string using the offline key and the randomly generated string, and
   grant the access request to access the limited access service in response to successfully verifying the user equipment identifier and the encrypted string.

4. The device of claim 3,
   wherein, in order to verify the user equipment identifier, the circuitry is further configured to
   determine whether the user equipment identifier is in the whitelist; and
   transmit a denial of access in response to determining that the user equipment identifier is not in the whitelist.

5. The device of claim 3,
   wherein, in order to verify the encrypted randomly generated string, the circuitry is further configured to:
   encrypt the randomly generated string using the offline key, and
   determine whether the encrypted string received from the application matches the result of encrypting the randomly generated string; and
   transmit a denial of access in response to determining that the encrypted string does not match the result of encrypting the randomly generated string.

6. The device of claim 1,
   wherein the secure element is further configured to store a pairing key, and
   wherein the circuitry is further configured to establish a secure communication tunnel with the user equipment using the pairing key before the notifying of the registration service.

7. The device of claim 6, wherein the circuitry is further configured to establish the secure communication tunnel using a peer-to-peer communication protocol.

8. A method comprising:
   notifying a user equipment of a registration service;
   receiving a registration request from the user equipment, the registration request for permission to access the limited access service, the registration request having a user identifier;
   generating a challenge for a registry server based on a device authentication key, the device authentication key accessed from a secure element;
   transmitting an authorization request to the user equipment, the authorization request including a request for authorization from the registry server, the device identifier, the user identifier, and the challenge, wherein the device identifier is retrieved from a memory;
   receiving an authorization response from the registry server via the user equipment, the authorization response including an authorization confirmation and a registry server signature;
   verifying the registry server signature using a registry certificate, the registry certificate accessed from the secure element; and
   notifying the user equipment of a limited access service in response to receiving the authorization confirmation and successfully verifying the registry server signature.

9. The method of claim 8, further comprising, in response to receiving the authorization confirmation and successfully verifying the registry server signature:
   generating an offline key in the secure element associated with the user equipment identifier,
   transmitting a copy of the offline key to the application, and
   adding the user equipment identifier to a whitelist, the whitelist accessed from the memory.

10. The method of claim 9, further comprising:
    receiving an access request from the user equipment for accessing the limited access service, the access request including the user equipment identifier,
    verifying the user equipment identifier using the whitelist,
    transmitting a randomly generated string to the user equipment,
    receiving an encrypted string from the user equipment,
    verifying the encrypted string using the offline key and the randomly generated string, and
    granting the access request to access the limited access service, in response to successfully verifying the user equipment identifier and the encrypted string.

11. The method of claim 10, wherein the verifying the user equipment identifier includes
- determining whether the user equipment identifier is in the whitelist, and
- transmitting a denial of access in response to determining that the user equipment identifier is not in the whitelist.

12. The method of claim 10, wherein the verifying the encrypted randomly generated string includes
- encrypting the randomly generated string using the offline key, and
- determining whether the encrypted string received from the user equipment matches the result of encrypting the randomly generated string, and
- transmitting a denial of access in response to determining that the encrypted string does not match the result of encrypting the randomly generated string.

13. The method of claim 8, further comprising:
- establishing a secure communication tunnel with the user equipment using a pairing key before the notifying of the registration service, the pairing key accessed from the secure element.

14. The method of claim 13, further comprising establishing the secure communication tunnel using a peer-to-peer communication protocol.

15. A computer-readable storage medium including instructions executable by a controller of a user equipment to cause the controller to perform operations comprising:
- notifying a user equipment of a registration service;
- receiving a registration request from the user equipment, the registration request for permission to access the limited access service, the registration request having a user identifier;
- generating a challenge for a registry server based on a device authentication key, the device authentication key accessed from a secure element;
- transmitting an authorization request to the user equipment, the authorization request including a request for authorization from the registry server, the device identifier, the user identifier, and the challenge, wherein the device identifier is retrieved from a memory;
- receiving an authorization response from the registry server via the user equipment, the authorization response including an authorization confirmation and a registry server signature;
- verifying the registry server signature using a registry certificate, the registry certificate accessed from the secure element; and
- notifying the user equipment of a limited access service in response to receiving the authorization confirmation and successfully verifying the registry server signature.

16. The computer-readable storage medium of claim 15, wherein the operations further comprise, in response to receiving the authorization confirmation and successfully verifying the registry server signature:
- generating an offline key in the secure element associated with the user equipment identifier,
- transmitting a copy of the offline key to the application, and
- adding the user equipment identifier to a whitelist, the whitelist accessed from the memory.

17. The computer-readable storage medium of claim 16, wherein the operations further comprise:
- receiving an access request from the user equipment for accessing the limited access service, the access request including the user equipment identifier,
- verifying the user equipment identifier using the whitelist,
- transmitting a randomly generated string to the user equipment,
- receiving an encrypted string from the user equipment,
- verifying the encrypted string using the offline key and the randomly generated string, and
- granting the access request to access the limited access service, in response to successfully verifying the user equipment identifier and the encrypted string.

18. The computer-readable storage medium of claim 17, wherein the verifying the user equipment identifier includes
- determining whether the user equipment identifier is in the whitelist, and
- transmitting a denial of access in response to determining that the user equipment identifier is not in the whitelist.

19. The computer-readable storage medium of claim 17, wherein the verifying the encrypted randomly generated string includes
- encrypting the randomly generated string using the offline key, and
- determining whether the encrypted string received from the user equipment matches the result of encrypting the randomly generated string, and
- transmitting a denial of access in response to determining that the encrypted string does not match the result of encrypting the randomly generated string.

20. The computer-readable storage medium of claim 15, further comprising:
- establishing a secure communication tunnel with the user equipment using a pairing key before the notifying of the registration service, the pairing key accessed from the secure element.

\* \* \* \* \*